Patented Oct. 3, 1950

2,524,728

UNITED STATES PATENT OFFICE 2,524,728

MITICIDAL COMPOSITION COMPRISING DI-(4 - CHLOROPHENOXY) - METHANE AND THE DICYCLOHEXYLAMINE SALT OF 2,4-DINITRO-6-CYCLOHEXYL PHENOL

Oscar H. Hammer, South Haven, Mich., assignor to The Dow Chemical Company, Midland, Mich., a corporation of Delaware No Drawing. Application January 7, 1948, Serial No. 1,073

2 Claims. (Cl. 167—31)

This invention relates to parasiticides and is particularly concerned with a new and improved toxicant composition including a mixture of di-(4-chlorophenoxy)-methane and the dicyclohexyl-amine salt of 2,4-dinitro-6-cyclohexyl phenol.

One of the problems encountered in the control of insects and other agricultural pests has been the limited tolerance of the host vegetation for toxicants commonly employed. The control of a variety of infesting organisms on a given host plant has been frequently inadequate, because known toxicants may be effective against one or more varieties of organisms only to allow the abundant multiplication of others. Difficulties also have arisen due to the specificity of toxicants for certain stages of growth in the life cycles of pests; thus one toxicant may be an adequate ovicide and be without effect upon adult forms, and conversely.

One object of this invention is to provide a toxicant mixture which will be more effective against insect and fungus pests than many compositions at present in general use. An additional object is to provide a product which will be effective against a wider variety of pests and against a greater number of forms in the life cycles of such pests. Another object is to provide a means of controlling agricultural pests, which makes adequate control possible with materially reduced concentrations of the toxicants. A further object of this invention is to provide a toxicant mixture in which the constituents co-operate with each other to produce an effect which is greater than the additive effect shown by the constituents of the mixture in equivalent amounts. Additional objects will become apparent from the following specification.

According to this invention it has been discovered that a mixture of di-(4-chlorophenoxy)-methane and the dicyclohexyl-amine salt of 2,4-dinitro-6-cyclohexyl phenol, when applied to growing vegetation in amounts required to control parasites, gives notably improved results as compared with the individual toxicants or with other toxicants commonly used for similar purposes. In such parasiticidal compositions the toxicants are mutually activating and exert a synergistic effect. Such a mixture is effective at lower concentrations than many known parasiticides and is capable of accomplishing a total kill of pests without injury to the plant. This mixture is also superior with respect to the control of both the egg and adult stages in the life cycles of certain important agricultural pests, and exerts a residual toxicity which aids in controlling reinfestation of the plants that have been treated with it.

In carrying out this invention di-(4-chlorophenoxy)-methane and the dicyclohexyl-amine salt of 2,4-dinitro-6-cyclohexyl phenol are compounded in any convenient manner, such as by grinding together, simple mixing, etc. The exact proportions of the mixture depend upon the tolerance of the host plant for the toxicant mixture, the type of pest to be controlled, the form in which the toxicant mixture is to be applied, and the conditions under which such application is to be made.

In the preferred method of operation from about 1 to 20 parts by weight of di-(4-chlorophenoxy)-methane is employed with 1 part by weight of the dicyclohexylamine salt of 2,4-dinitro-6-cyclohexyl phenol. While these proportions result in compositions of unusually desirable properties with regard to immediate and residual toxicity, it is to be understood that any mutually activating proportions of the constituents may be used.

The toxicant mixture may be incorporated with various inert carriers, such as diatomaceous earth, talc, bentonite, wood flours, inorganic phosphates, gypsum and the like, to form either concentrates or agricultural dusting compositions. When concentrates are produced, they may be subsequently diluted with additional inert carrier or suspended in water or other inert liquid carrier to form sprays. The toxicant mixture also may be employed alone in water suspension, or incorporated with various wetting, dispersing, and sticking agents and subsequently diluted to produce dust or spray compositions of any desired concentration. The mixture may be incorporated in other conventional carriers such as solvents, oil-in-water emulsions, or aerosols, either as the sole toxic ingredient of such composition or in combination with other insecticidal or fungicidal toxicants.

In operating in accordance with this invention, dust comprising from 1–5 per cent of the toxic mixture is applied in such amount as to obtain a relatively uniform coverage on all surfaces of the plant under treatment. Sprays are compounded from the mixed toxicants or from compositions containing the toxicants in such proportions that the final composition contains at least 0.25 pound of the toxicant mixture per 100 gallons of liquid. The exact concentration is largely dependent upon the particular pest to be controlled and the tolerance of the plant under treatment.

The following examples set forth certain embodiments of the invention but are not to be construed as limiting the same:

EXAMPLE 1

Dust concentrates having the following compositions by weight were prepared by mixing and grinding the indicated constituents:

Concentrate A

| | Per cent |
|---|---|
| Dicyclohexyl-amine salt of 2,4-dinitro-6-cyclohexyl phenol | 20 |
| Gypsum | 74.5 |
| Bentonite | 5 |
| Sodium lauryl sulphate | 0.5 |

Concentrate B

| | Per cent |
|---|---|
| Di-(4-chlorophenoxy)-methane | 40 |
| Fuller's earth | 57 |
| Sodium salt of a condensed alkyl aryl sulfonic acid | 2 |
| Alkali metal long chain aliphatic alcohol sulphate | 1 |

The respective concentrates were dispersed in water to prepare spray compositions having the following concentration of toxicant per 100 gallons:

1. 0.025 pound dicyclohexyl-amine salt of 2,4-dinitro-6-cyclohexyl phenol.
2. 0.2 pound di-(4-chlorophenoxy)-methane.
3. 0.025 pound dicyclohexyl-amine salt of 2,4-dinitro-6-cyclohexyl phenol.
   0.2 pound di-(4-chlorophenoxy)-methane.

The three spray compositions were applied to Jonathan apple trees in an orchard heavily infested with European red mite and in such amount that a relatively uniform coverage of all plant surfaces was obtained. After five days the trees were examined to ascertain the degree of control of mites that had been obtained, and the following situation expressed in per cent control was found to exist:

| | |
|---|---|
| No. 1 | 49.0 |
| No. 2 | 5.3 |
| No. 3 | 80.7 |

EXAMPLE 2

A similar set of spray compositions was prepared from concentrates A and B by dispersing them in water in the following concentrations per 100 gallons:

1. 0.03 pound dicyclohexyl-amine salt of 2,4-dinitro-6-cyclohexyl phenol.
2. 0.4 pound di-(4-chlorophenoxy)-methane.
3. 0.03 pound dicyclohexyl-amine salt of 2,4-dinitro-6-cyclohexyl phenol.
   0.4 pound di-(4-chlorophenoxy)-methane.

The three spray compositions were applied to stands of cranberry bean plants which were infested with the adult stage of the two-spotted spider mite. At the end of 72 hours and 120 hours the bean plants were examined. The following percentage controls were observed:

| | 72 Hours | 120 Hours |
|---|---|---|
| No. 1 | 3 | 4 |
| No. 2 | 4 | 12 |
| No. 3 | 55 | 69 |

The compositions of this invention may be employed similarly in either dormant or summer applications for the control of other organisms such as thrips, Colorado potato beetle, tent caterpillar, bean mildew, apple scab, and snapdragon rust.

I therefore distinctly point out and claim as my invention:

1. A miticide composition comprising as active toxicants di-(4-chlorophenoxy)-methane and the dicyclohexylamine salt of 2,4-dinitro-6-cyclohexyl phenol, and wherein the toxicants are mutually activating and produce a synergistic effect as regards miticidal toxicity.

2. A miticide composition comprising as active toxicants 8 parts by weight of di-(4-chlorophenoxy)-methane in mixture with 1 part of the dicyclohexylamine salt of 2,4-dinitro-6-cyclohexyl phenol, and wherein the toxicants are mutually activating and produce a synergistic effect as regards miticidal toxicity.

OSCAR H. HAMMER.

REFERENCES CITED

The following references are of record in the file of this patent:

UNITED STATES PATENTS

| Number | Name | Date |
|---|---|---|
| 2,225,619 | Britton et al. | Dec. 24, 1940 |
| 2,330,234 | Moyle | Sept. 28, 1943 |